Patented Jan. 16, 1945

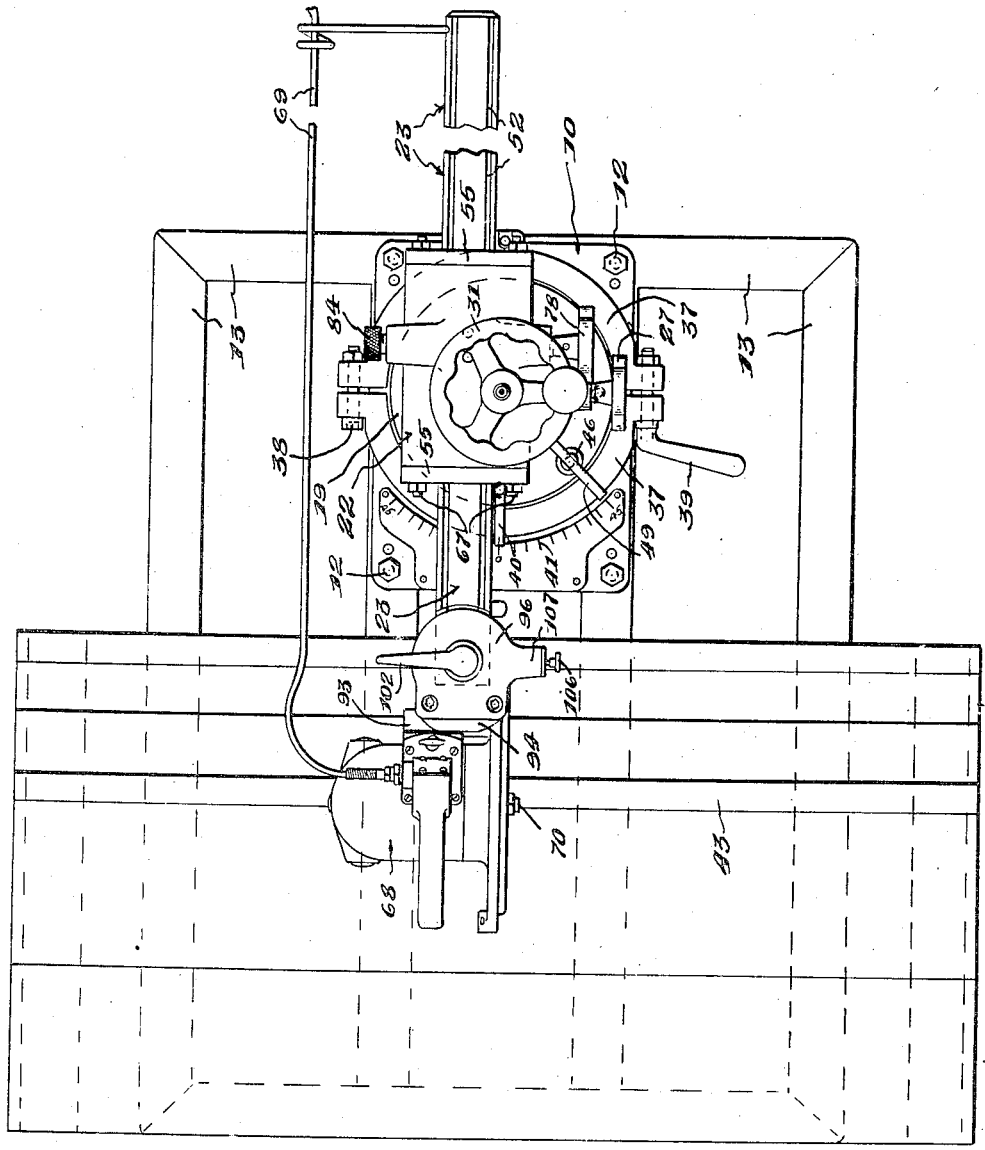

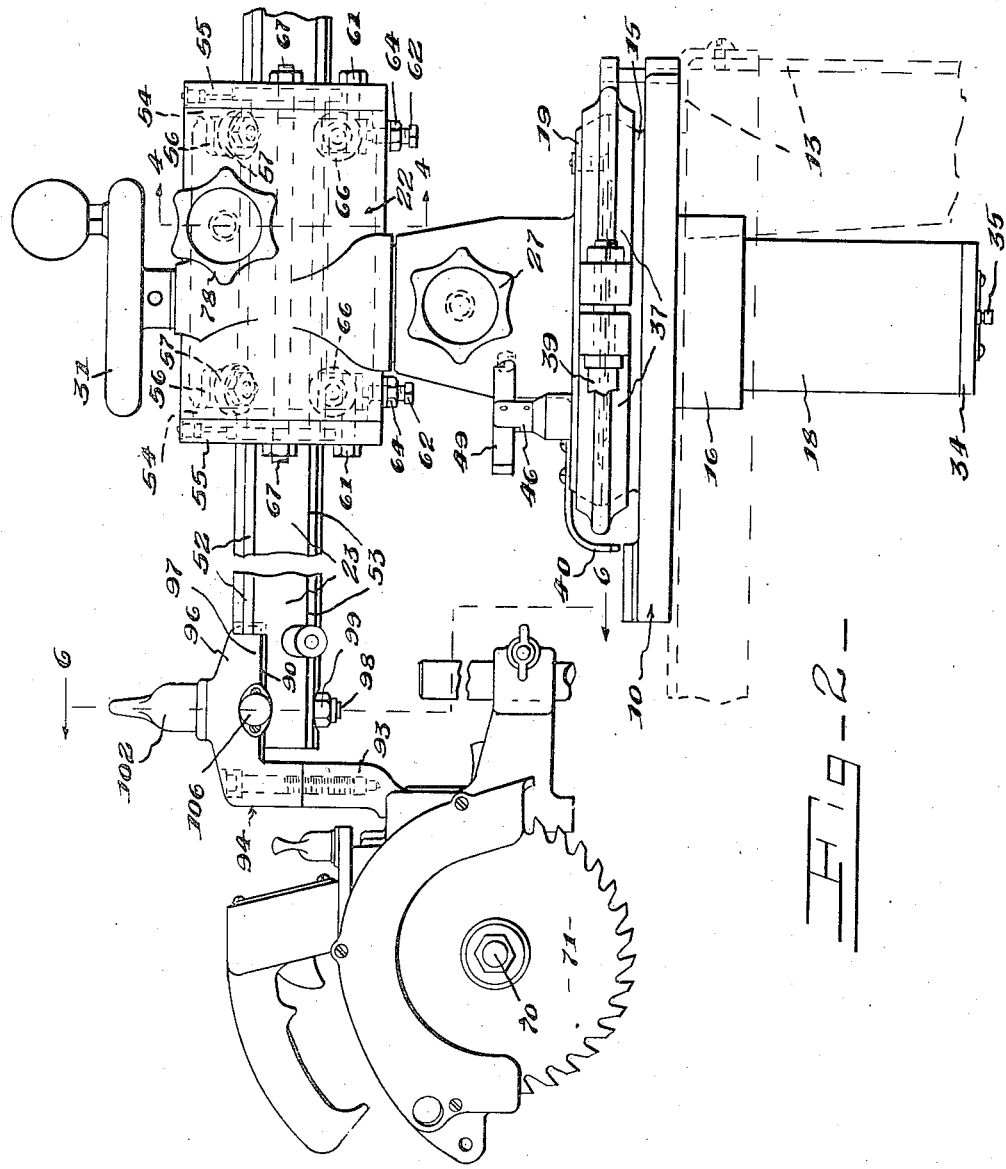

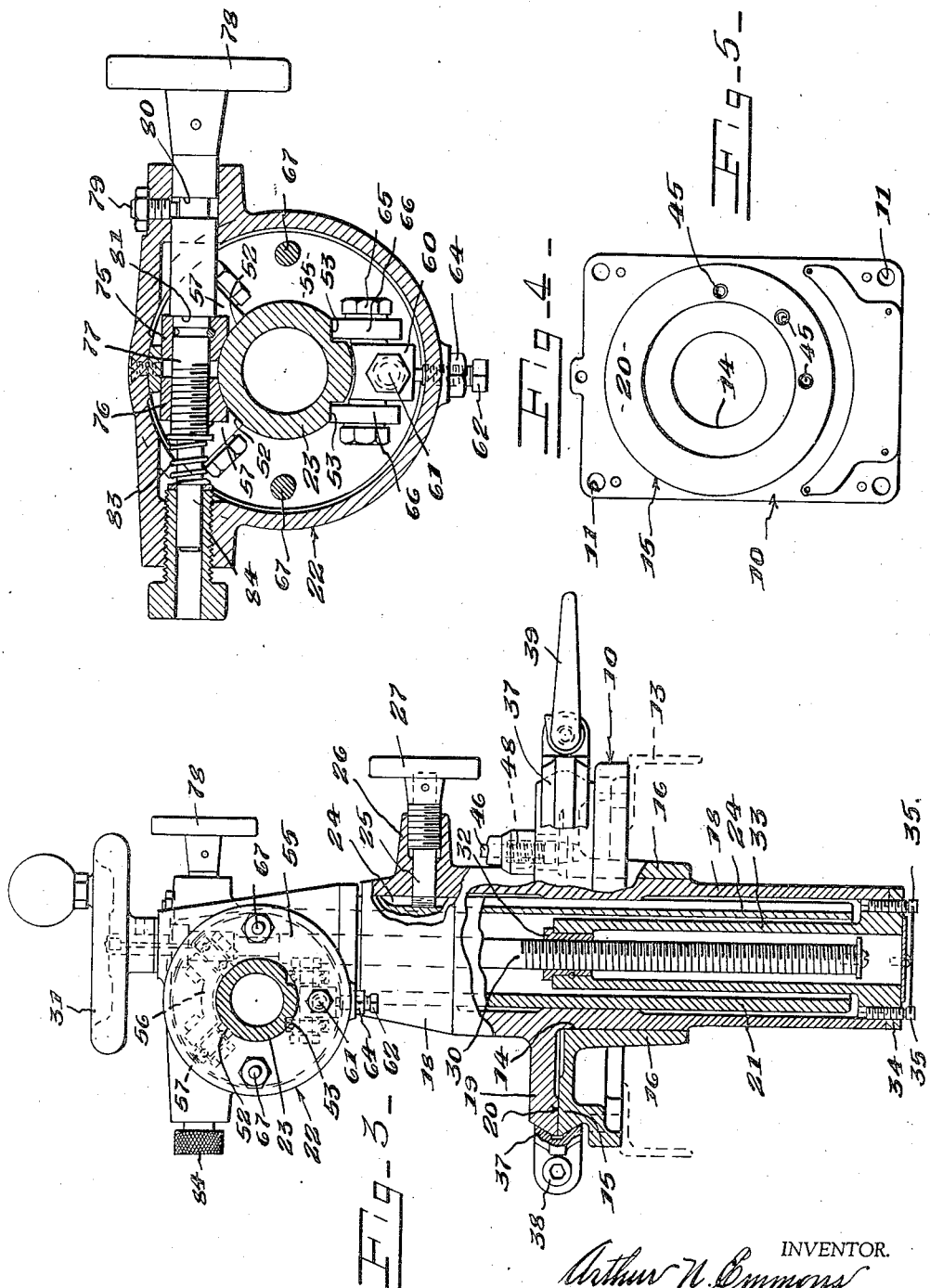

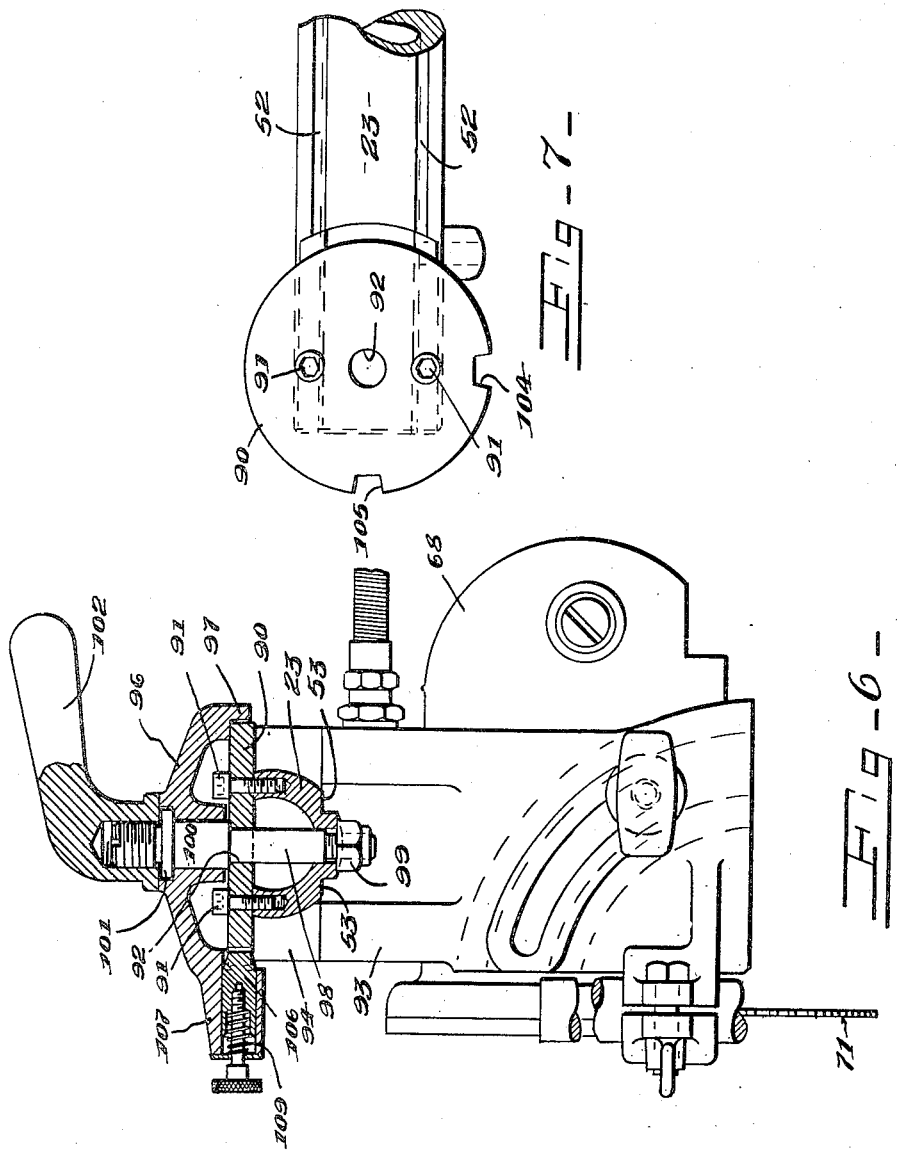

2,367,461

UNITED STATES PATENT OFFICE 2,367,461

WOODWORKING MACHINE

Arthur N. Emmons, Nedrow, N. Y., assignor to The Porter-Cable Machine Company, Syracuse, N. Y., a corporation of New York Application January 2, 1941, Serial No. 372,792

4 Claims. (Cl. 143—6)

This invention relates to a wood working machine of the type commonly known as a radial arm saw. These machines consist generally of a suitable base mounted upon a bench or standard. A vertically arranged stem is rotatably mounted in the base and is provided at its upper end with a laterally extending arm to which a power operated arbor is secured and which is adapted to receive a circle saw, dado head, or similar tool. The general arrangement is such that the saw or tool arbor is suspended over the bench and is movable transversely thereof.

The machine is operated by placing a board or piece of lumber upon the bench and moving the tool arbor transversely to sever the board, or to perform the desired operation thereon. The purpose of having the stem rotatably mounted in the base is to permit the tool arbor to be moved transversely at an angle to the axis of the piece being operated on in order to effect an angular cut or a compound angular cut as in the case of forming a jack rafter.

This invention has to do generally with certain improvements on the type of machine referred to and has as an object an economical structure which is particularly rigid and durable in use and which embodies mechanism for adjusting the tool arbor supporting arm both vertically and rotatably, the vertical adjusting mechanism being totally enclosed to fully protect it from the excessive amount of dust accompanying the use of the machine.

The invention has as a further object a particularly efficient means for rotatably coupling the stem or support to the base and which is conveniently operable to rigidly clamp the support to the base. This clamping means embodies a structure by which the support or stem, including the arbor supporting arm, can be quickly and conveniently removed from the base in order to make the machine conveniently portable for transportation from one job to another.

The particular machine herein disclosed and referred to is the type wherein the tool supporting arm is slidably mounted in the head portion of the supporting stem, and the invention has as a further object a particularly novel head portion structure whereby the arm is supported in antifriction means housed entirely within the head portion and which function to permit the arm to be easily moved axially in the head portion and at the same time to rigidly support the arm to avoid excessive vibration of the tool while it is in operation.

The invention has as a further object a tool supporting bracket structure adjustably mounted on the end of the tool supporting arm and which can be quickly and conveniently adjusted to move the tool arbor from cut-off position to ripping position.

The invention consists in the novel features and in the combinations and constructions hereinafter set forth and claimed.

In describing this invention, reference is had to the accompanying drawings in which like characters designate corresponding parts in all the views.

Figure 1 is a top plan view of a machine embodying my invention and including the bench or support on which the machine is mounted.

Figure 2 is a side elevational view of the machine with a portion of the bench structure shown in dotted outline.

Figure 3 is a front elevational view with parts broken away and parts in section.

Figure 4 is a sectional view through the head portion of the supporting stem taken on line 4—4, Figure 2.

Figure 5 is a top plan view of the base casting.

Figure 6 is a sectional view of the tool supporting bracket and contiguous portion of the tool supporting arm taken on line 6—6, Figure 2.

Figure 7 is a top plan view of the end portion of the tool supporting arm to which the tool supporting bracket is secured.

The base of the machine consists of a rectangular casting 10 provided with corner apertures 11 to receive bolts 12 by which the base is secured to the bench 13. The base 10 is formed with an aperture 14 and a circular shoulder 15 arranged concentric with the aperture. The periphery of the shoulder 15 extends at an angle as indicated in Figure 3. The central portion of the base, in which the aperture 14 is formed, is provided with a depending hub 16.

A tubular support 18 is vertically arranged in the aperture 14 and is formed with a radial flange 19 overlying the marginal surface 20 of the shoulder 15, and the peripheral edge of the flange 19 extends in opposite angular relation to the shoulder 15, see Figure 3. The support 18 extends downwardly an appreciable distance below the base and upwardly therefrom, and is bored to slidably receive a stem 21, the upper end of which is provided with a laterally arranged substantially cylindrical head 22. The head portion 22 is offset slightly from the axis of the stem 21 and is apertured to receive the tool supporting arm 23. The stem 21 is formed on one side with an axially extending keyway 24 to receive the inner end of a screw 25 threading into a laterally extending boss 26 on the support 18. The screw 25 is provided with a suitable hand wheel 27 and the screw functions to prevent rotation of the stem relative to the support, and may also function to clamp the stem to the support when the stem has been adjusted vertically thereof.

The vertical adjustment of the stem relative to the support is effected by means of a screw 30 arranged within the hollow stem and being arranged at its upper end in the head portion so as not to have axial movement relative thereto, and is provided at its upper end with a suitable hand wheel 31 by which the screw may be conveniently rotated. The screw 30 threads into a nut 32 mounted in the upper end of a tubular portion 33 of a closure 34 detachably secured to the lower end of the support 18 as by screws 35.

With this arrangement, the interior of the supporting stem is completely closed and the screw and nut are completely protected from dust and dirt when the machine is in operation.

It will be apparent, as the description proceeds, that the stem and head portion 22 are adjustable vertically to permit different depths of cut by the tool.

The support 18 is rotatably coupled to the base 10 by an annular member 37, the inner surface of which is of V formation, or complemental to the peripheral surface of the shoulder 15 and flange 19. With this arrangement, the support is rotatably coupled to the base and is retained against axial movement relative to the base. Preferably, the annular member 37 is formed of two semi-circular sections, like ends of which are secured together by a bolt 38, and the opposite ends by a manually operable clamping bolt 39. The support is provided with a pointer 40, the end of which is movable over a series of graduations 41 formed on the base to conveniently indicate the angular movement of the arm 23 relative to the stop piece 43 mounted on the bench 13.

Angular adjustment of the support is conveniently effected by loosening the clamping bolt 39, rotating the support in the base to the desired angle and then tightening the clamping bolt. In order to minimize the time for effecting this adjustment at the more commonly used angles, such for example as 45°, the base, or the marginal surface 20, is formed with a plurality of circumferentially spaced apart apertures 45, and the flange 19 of the support is provided with an axially movable pin 46 which is arranged to permit the lower end thereof to enter a selected one of the apertures 45. The locating pin 46 is urged downwardly by a helical compression spring 48 and is moved upwardly by means of a hand lever 49.

This arrangement forms a particularly convenient means for effecting the angular adjustment of the arm 23, and when it is desired to transport the machine from one job to another, it is only necessary to loosen the clamping bolt 39 and the bolt 38 sufficiently to uncouple the flange 19 from the shoulder 15 and the entire structure of the machine can be readily lifted from the base 10.

The arm 23 is of tubular formation to provide rigidity and lightness, and is formed with a flattened surface 52 extending axially of the arm on each side adjacent the top thereof, and the arm is also formed with an angular groove 53 extending axially on each side adjacent the bottom thereof. Each end of the cylindrical head 22 is bored to receive a circular shoulder 54 formed upon an end disk 55. Each of the end disks 55 are apertured to slidably receive the arm 23 and are provided with inwardly extending bosses 56 in which the upper guiding rolls 57 are journalled and which are arranged to coact with the flattened surfaces 52 on the arm.

A block 60 is adjustably mounted on the bottom portion of each of the disks 55 by a screw 61, the adjustment being toward and from the axis of the arm 23 and being effected by a screw 62 threading through the wall of the head 22 with the inner end of the screw engaging the block 60, and the screw being secured in adjusted position as by a jam nut 64. A bolt 65 extends transversely through the block 60, and an antifriction roller 66 is carried by each end of the bolt, and these rollers are arranged to engage the angular grooves 53 in the arm 23.

The end disks 55 are detachably secured in the ends of the head 22 by tie rods 67, see Figures 2 and 4. With this arrangement, the arm 23 is supported for easy sliding movement in the head 22 and the blocks 60 may be adjusted to eliminate any looseness or play between the arm and the head.

In Figures 1 and 2, I have illustrated a power driven tool arbor attached to the forward end of the arm 23 in the nature of a portable power driven hand saw. This saw consists of a body 68 in which an electric motor is mounted and which is energized by the cable 69 and which is operable to rotate an arbor 70 at the proper speed and on which may be mounted a wood working tool, such as a circle saw 71. The saw per se forms no part of this invention and any suitable power driven tool arbor may be attached to the arm 23, or the tool supporting bracket hereinafter described.

Normally, the arm 23 is arranged in its inner position with the saw or tool arbor positioned behind the stop 43, as illustrated in Figures 1 and 2.

In operation the board, or piece being operated upon, is positioned against the stop 43 and the tool arbor is pulled outwardly or toward and from the bench causing the saw 71, or other tool, to traverse the work. If it is desired to make an angular cut on the work, the support 18 is moved rotatably in the base 10, as previously explained.

When it is desired to use the saw for a ripping operation, the saw is moved in annular relation to the arm 23 to position the saw blade 71 at right angles thereto, or in parallel relation to the stop 43. The saw blade is adjusted at desired distances from the stop 43 by sliding the arm 23 in the head 22 and thereupon securing it in adjusted position by clamp blocks 75, 76 engaging the arm 23. The blocks 75, 76 are mounted upon a stem or shaft 77 extending transversely through the head 22 above the arm 23 and provided at one end with a suitable hand wheel 78. The shaft 77 is retained against axial movement by means of a stud 79 threaded into the head with the lower end of the stud engaging a groove 80 formed in the shaft.

The block 75 engages a shoulder 81, and the block 76 is threaded upon the shaft 77. The inner end of the stud 79 is somewhat less in diameter than the width of the groove 80 to permit a slight end play in the shaft, and the shaft is yieldingly urged to the right, Figure 4, by a helical compression spring 83 acting against the threaded portion of the shaft and a bushing 84 threaded into the opposite side of the head. This arrangement is such that when the hand wheel 78 is rotated in one direction, the blocks 75, 76 are moved into tight engagement with the arm 23, and axial movement of the arm is thereupon prevented.

These machines are used extensively for outdoor construction work and accordingly it is extremely advantageous that both the vertical and rotatable adjustments be effected as conveniently and quickly as possible. It is also of great advantage that the adjustment of the power tool from cut-off to ripping position be likewise conveniently and quickly effected and that the tool can be likewise conveniently removed from the arm. The top portion of the arm 23 is cut away at the end of the arm to receive a flat plate or disk 90 which is secured to the arm as by bolts 91, see Fig. 6. The plate 90 is formed with a central aperture 92. The tool arbor is mounted on the depending portion 93 of a bracket 94 having a horizontally arranged head portion 96 overlying and being supported by the plate 90 and being formed with an abutting surface complemental to the plate 90.

As here shown, the head portion 96 is formed with a depending annular flange 97 encircling the periphery of the plate. The plate is further secured to the arm 23 by a stud 98 extending through the aperture 92 and being provided at its lower end with a nut 99. The stud 98 is formed with an enlarged portion 100 forming a shoulder to engage the top of the plate 90, the enlarged portion extending through an aperture formed in the head 96 and being formed with a collar 101 engaging the head and accordingly, preventing removal of the head from the stud. The upper end of the stud is threaded to receive a hand nut 102. Accordingly, the head portion 96 is mounted upon the plate 90 and is adjustable relatively thereto on a vertical axis and may be securely clamped in any adjusted position.

Inasmuch as the saw blade is usually positioned either at right angles or in parallel relation to the stop 43, the peripheral edge of the plate 90 is formed with notches 104, 105 (see Fig. 7), and the head portion is provided with a locating pin 106 slidably mounted in a boss 107 and being yieldingly pressed inwardly by a compression spring 109. The inner end of the pin 106 is arranged to be positioned either in the notch 104 or 105 and functions to quickly and correctly position the saw block for either cut-off or ripping operations. Inasmuch as the bracket 95 is supported on the plate 90, the tool arbor is conveniently adjusted by simply loosening the hand nut 102, it not being necessary for the operator to manually support the saw or tool arbor while it is being adjusted relative to the arm 23.

What I claim is:

1. In a wood working machine of the type described comprising a base formed with an aperture, a vertically arranged tubular support rotatably mounted in said aperture and having an uninterrupted side wall, a tubular stem arranged in said support and being slidable axially thereof and being provided at its upper end with a laterally extending head, an arm slidably mounted in said head, a closure member detachably secured to the lower end of said support, a nut carried by said closure, a screw carried by the head of said stem and extending axially within the stem and threading into said nut and being operable upon rotation to effect vertical adjustment of the stem relative to the support, and a power operated tool arbor carried by said arm.

2. In a wood working machine of the type described comprising a base formed with an aperture, a vertically arranged tubular support rotatably mounted in said aperture and having an uninterrupted side wall, a tubular stem arranged in said support and being slidable axially thereof and being provided at its upper end with a head portion, a tool supporting arm extending laterally from said head and a power driven tool arbor carried by said arm, a closure member detachably secured to the lower end of said tubular support and being formed with a tubular projection extending upwardy within said stem, a nut carried by the upper end of said tubular portion of the closure, and a screw carried by said head and extending axially within the stem and threading into said nut, said screw being operable upon rotation to effect axial movement of the stem relative to said support.

3. In a wood working machine of the type described comprising a base, a vertically arranged stem carried by the base and being provided with a head portion apertured to slidably receive an arm, an arm slidably mounted in said aperture, a circular plate arranged horizontally and detachably secured to one end of said arm, a tool supporting bracket having a circular head portion overlying and being supported by said plate and being adjustable relatively thereto about a vertical axis, the periphery of said plate being formed with a plurality of circumferentially spaced apart notches, a locating pin carried by the head portion of said bracket and being movable into and out of selected ones of said notches to retain said bracket against rotation relative to said arm.

4. In a machine of the type described comprising a base, a vertically arranged stem carried by the base and being provided with a hollow cylindrical head portion at its upper end, said head portion being arranged horizontally to slidably receive a tool supporting arm, an arm slidably mounted in said head and a power operated tool arbor carried at one end of said arm, an end member detachably secured to each end of said head portion, each of said end members being apertured to receive said arm and being provided with a plurality of antifriction members cooperable to support and guide said arm during reciprocation thereof, and one of said antifriction members carried by each end member being adjustable toward and from the axis of said arm.

ARTHUR N. EMMONS.